US006891876B2

United States Patent
Sutter et al.

(10) Patent No.: US 6,891,876 B2
(45) Date of Patent: May 10, 2005

(54) METHOD AND APPARATUS FOR POLARIZATION AND WAVELENGTH INSENSITIVE PUMPING OF SOLID STATE LASERS

(75) Inventors: Dirk Sutter, Mountain View, CA (US); James D. Kafka, Palo Alto, CA (US)

(73) Assignee: Spectra Physics, Inc., Mountain View, CA (US)

(*) Notice: Subject to any disclaimer, the term of this patent is extended or adjusted under 35 U.S.C. 154(b) by 0 days.

(21) Appl. No.: 10/233,138

(22) Filed: Aug. 30, 2002

(65) Prior Publication Data

US 2004/0042522 A1 Mar. 4, 2004

(51) Int. Cl.[7] ............................................... H01S 3/091
(52) U.S. Cl. ............................ 372/70; 372/69; 372/71
(58) Field of Search ............................. 372/69–71, 75

(56) References Cited

U.S. PATENT DOCUMENTS

| | | | |
|---|---|---|---|
| 5,200,947 A | 4/1993 | Satake et al. ............... 369/275 |
| 5,553,088 A | 9/1996 | Brauch et al. ................ 372/34 |
| 5,790,574 A * | 8/1998 | Rieger et al. .................. 372/70 |
| 5,999,544 A * | 12/1999 | Petersen ....................... 372/69 |
| 5,999,554 A * | 12/1999 | Marshall ....................... 372/71 |
| 6,304,584 B1 * | 10/2001 | Krupke et al. ................ 372/75 |
| 6,347,109 B1 * | 2/2002 | Beach et al. .................. 372/75 |
| 2001/0055422 A1 | 12/2001 | Roustaei ..................... 382/181 |
| 2003/0161376 A1 | 8/2003 | Zapata ......................... 372/70 |

* cited by examiner

Primary Examiner—Don Wong
Assistant Examiner—James Menefee
(74) Attorney, Agent, or Firm—Heller Ehrman White & McAuliffe; Paul Davis

(57) ABSTRACT

An optical system has a diode pump source, and a gain media made of a material with an anisotropic absorption. The gain media is cut at an angle to produce substantially polarization-independent absorption of a pump beam. An optical coupler is positioned between the diode pump source and the gain media. The optical coupler produces a pump beam that has substantially equal amounts of pump power along any two orthogonal axis that are orthogonal to the pump beam in the gain medium. The wavelength range allowed for the pump source is extended.

23 Claims, 6 Drawing Sheets

(a)

(b)

(a)

(b)

US 6,891,876 B2

METHOD AND APPARATUS FOR POLARIZATION AND WAVELENGTH INSENSITIVE PUMPING OF SOLID STATE LASERS

CROSS-REFERENCE TO RELATED APPLICATIONS

This application is related to U.S. patent application Ser. No. 10/233,140, and U.S. application Ser. No. 10/232,885 both of which are filed concurrently herewith.

BACKGROUND OF THE INVENTION

1. Field of the Invention

This invention relates to end-pumped solid-state lasers and amplifiers, and more particularly to an optical system that has performance which is substantially independent of the polarization or wavelength of the pump beam.

2. Description of Related Art

Laser action generally requires a laser active material and means of pumping said medium. Of particular importance are the solid-state lasers, in which the gain medium is solid; typically a crystal or glass doped with laser-active ions, and the material is optically pumped with light of a suitable wavelength.

Solid-state gain materials often show polarization dependent absorption of the pump light, which is particularly important for polarized pump beams, like those obtained from other lasers, e.g. laser diodes. Often the delivery optics for the pump beam can be simplified if the light entering the crystal is allowed to be unpolarized. An example of this is fiber-coupled pumping using long optical fibers for pump-beam delivery. Moreover, polarization multiplexing is an attractive approach for increasing the brightness of a pump beam by combining two orthogonally polarized pump beams into one. In some cases, including most thin disk laser systems, the pump light will not be absorbed in a single pass, but it will pass the laser crystal multiple times, such that the polarization of the pump light is rotated between individual passes. The integrated polarization of the pump light incident on the crystal can therefore be essentially unpolarized.

However, solid-state lasers are often designed such that they require linearly polarized pump light, e.g. because the laser crystal is cut at Brewster's angle or because its absorption spectrum is strongly dependent on polarization. The latter case usually originates from the desire to use the wavelength and polarization of the strongest absorption of the gain material. For practical lasers, however, this often requires very tight control of the wavelength of the pump light, which implies a control mechanism to adjust the temperature of the pumping laser diodes.

Solid-state lasers are usually pumped at or close to the wavelength of the peak absorption. Since the absorption peak is spectrally relatively narrow, a wavelength variation of the pump usually has a significant impact on the output of the laser. Even if the crystal can be chosen to be thick enough to absorb all pump light, which is possible for 4-level lasers and even 3- or quasi-3-level lasers provided that the crystal is pumped from both sides, changes in the wavelength of the pump light usually have a significant impact on the location wherein the light is absorbed in the crystal. This changes the pump-induced heating of the crystal, and the thermally induced lensing can change dramatically. Such a change in lensing will cause the output beam from an amplifier to change in size and divergence. The problem is more severe in an oscillator, wherein the lensing can cause the cavity to become geometrically unstable.

There is a need for a diode-pumped laser that can operate with unpolarized pump light. There is a further need for a diode-pumped laser that can operate over a large range of pump wavelengths.

SUMMARY OF THE INVENTION

Accordingly, an object of the present invention is to provide an improved diode-pumped optical system, and its methods of use.

Another object of the present invention is to provide a diode-pumped laser and its methods of use, with a performance that is substantially independent of the polarization of the pump beam.

A further object of the present invention is to provide a diode-pumped laser and its methods of use, that has an increased range of wavelengths over which the absorption of the pump beam is constant.

These and other objects of the present invention are achieved in an optical system that has a diode pump source, and a gain media made of a material with an anisotropic absorption. The gain media is cut at an angle to produce substantially polarization-independent absorption of a pump beam. An optical coupler is positioned between the diode pump source and the gain media. The optical coupler produces a pump beam that has substantially equal amounts of pump power along any two orthogonal axis that are orthogonal to the pump beam in the gain medium.

In another embodiment of the present invention, a method of broadening an absorption band in a gain media selects a polarization state of a pump beam. The pump beam is directed through the gain media in a direction to increase a range of wavelengths over which an absorption of the pump beam is constant.

In another embodiment of the present invention, an optical system includes a gain media and a diode pump source. An optical coupler is positioned between the gain media and the diode pump source. The optical coupler produces a pump beam with a polarization state that increases a range of wavelengths over which an absorption of the pump beam is constant.

DETAILED DESCRIPTION OF THE PREFERRED EMBODIMENT

Figure 1:
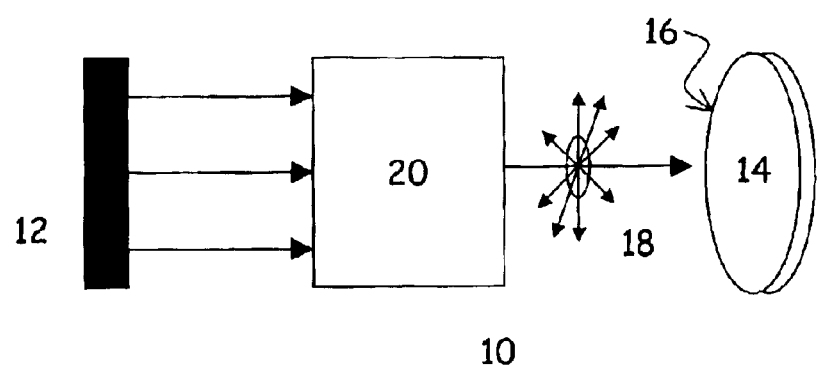
FIGS. 1(a) and 1(b) are schematic diagrams of embodiments of an optical system of the present invention.
Figure 1:
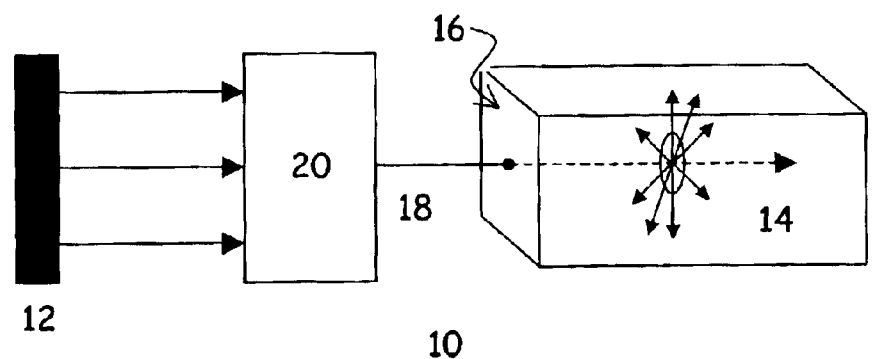
Figure 2:
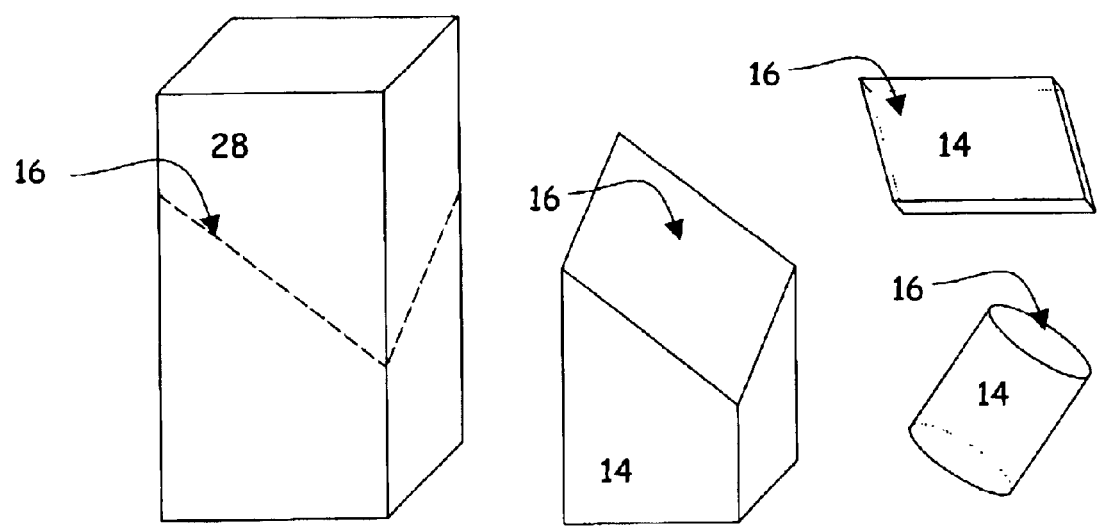
FIG. 2 is a schematic diagram that illustrates cut of the FIG. 1 gain media.

In one embodiment of the present invention, illustrated in FIGS. 1(a), 1(b) and 2, an optical system 10 includes a diode pump source 12 and a gain media 14. Gain media is made of a material with an anisotropic absorption and has a pump beam incidence surface 16 that is cut at an angle to produce substantially polarization-independent absorption of a pump beam 18.

Gain media 14 is cut in order to substantially equalize the absorption coefficient for the two principal polarizations of pump beam 18. In this manner, a change of the polarization state of pump beam 18 does not change the way that pump beam 18 is absorbed in gain media 14. Moreover, if the absorption spectra for the two principal polarizations of pump beam 18 cross in the wavelength range over which the pump source 12 is supposed to operate, a shift in wavelength that increases the absorption for one polarization, decreases the absorption for the other, will to first order not change the total absorption for pump beam 18 of essentially equal power along both principal polarization axes. This includes a pump beam 18 that is polarized at 45 degrees with respect to the principal axes or a circularly polarized pump beam. It also includes, but is not limited to an unpolarized pump beam 18. If the two absorption spectra do not cross but still exhibit shifted absorption peaks, the power ratio along the two principal polarization axes can be changed to achieve the same desired broadened wavelength range over which pump source can shift without changing the total absorption significantly.

An optical coupler 20 is positioned between diode pump source 12 and gain media 14. Optical coupler 20 produces a pump beam 18 that has substantially equal amounts of pump power along any two orthogonal axes that are orthogonal to the pump beam 18 in gain medium 14.

In another embodiment, an optical coupler 20 produces a pump beam 18 with a polarization state that increases a range of wavelengths over which an absorption of pump beam 18 is constant. If the wavelength of the pump beam changes, due to temperature changes in the diode pump source, the absorption of the pump beam 18 will remain constant. As a result, the thermal lens in the gain media and the performance of the optical system will also remain constant.

Gain media 14 can be a thin disk, as disclosed in U.S. patent application Ser. No. 10/233,140, filed concurrently, or have a number of different geometric configurations including but not limited to a slab, rod, polygon, and the like. Gain media 14 can be made of a variety of materials, including but not limited to, a ytterbium doped double-tungstate crystal, Yb:KGW, Yb:KYW, Yb:S-FAP, Nd:KGW, Nd:KYW, Nd:YVO$_4$, Cr:LiSAF, Cr:Forsterite, semiconductor gain media, and the like.

Pump beam 18 can be substantially unpolarized. Most diode pump sources are linearly polarized, however, unpolarized pump sources can result from fiber coupling the pump beam, combining pump sources of different polarizations and the like. Pump source 12 can be a fiber-coupled diode, a diode bar, one or more stacks of diodes, and the like. In one embodiment, pump beam 18 has a wavelength in the range of 931 to 952 nm.

Coupler 20 can include a polarization beam combiner. The polarization beam combiner can be a polarizing cube, plate polarizer or the like and combines the light from two orthogonally polarized diodes or diode stacks together. In various embodiments, coupler 20 is, an imaging coupler, a non-imaging coupler, a funnel, and the like. An example of a suitable funnel is disclosed in U.S. Ser. No. 09/401,146, filed: Sep. 22, 1999.

A relay optic can be included to re-image pump beam 18 multiple times into gain media 14, as disclosed in U.S. Pat. No. 5,553,088 incorporated herein by reference. Passage of pump beam 18 multiple times through gain media 14 can create a rotation of a polarization state of pump beam 18.

Gain media 14 can also be utilized as the gain element in an amplifier. The amplifier can be configured as a multi-pass amplifier.

Figure 3:
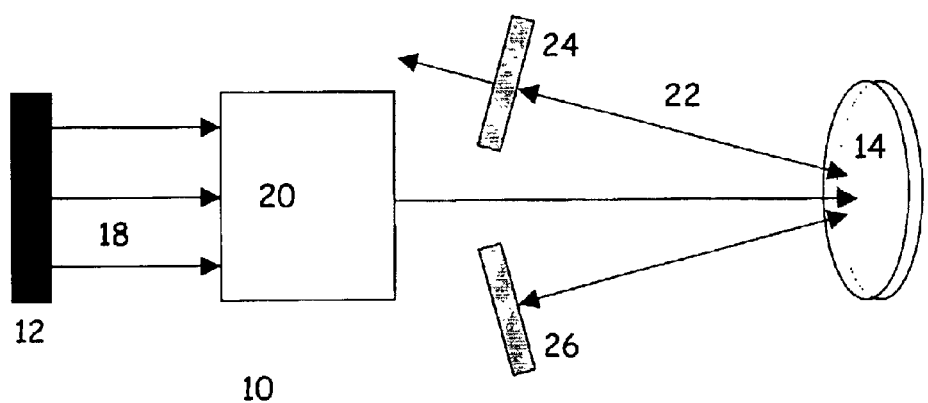
FIGS. 3(a) and 3(b) are schematic diagrams of embodiments of a laser oscillator of the present invention.
Figure 3:
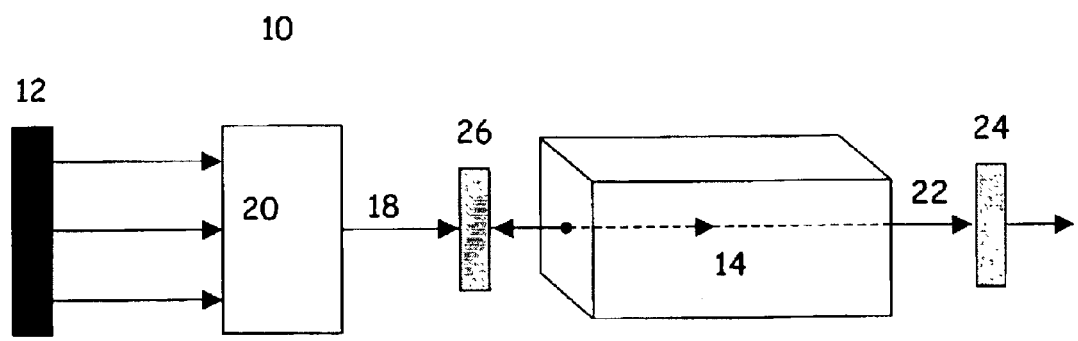

Referring to FIG. 3, system 10 can include a laser resonator, generally denoted as 22, with an output coupler 24 and a high reflector 26. A mode of resonator 22 can be mode-matched to a size of a pumped volume in gain media 14. Laser resonator 22 can be configured to form a regenerative amplifier.

Figure 4:
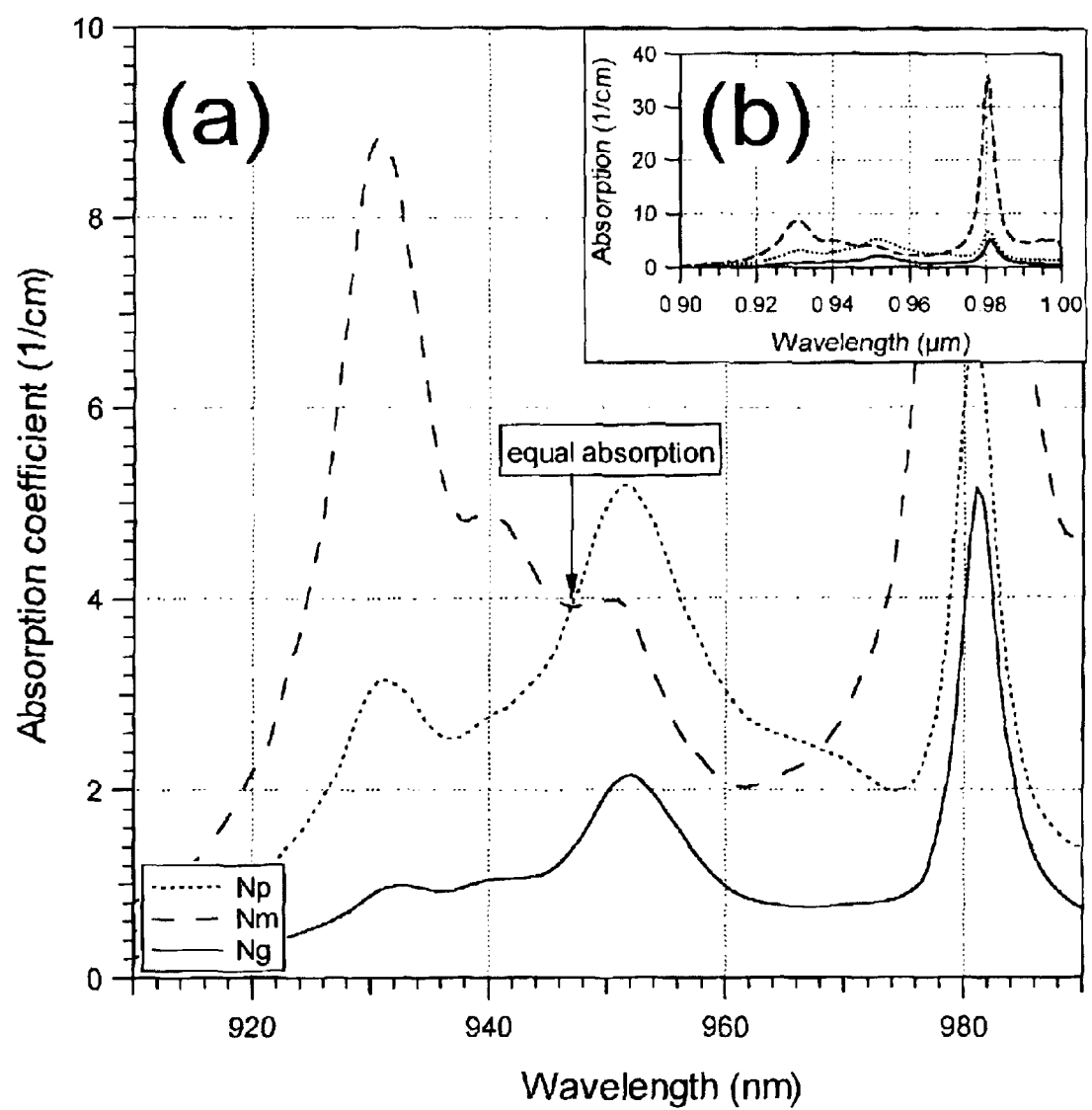
FIG. 4 shows the absorption coefficient for a KYW crystal with 5% Yb doping concentration.

FIG. 4 shows the absorption coefficient for a Yb:KYW crystal with 5% ytterbium doping concentration, calculated assuming the absorption cross-sections of KYbW given by Pujol et al. in Physical Review B, Vol. 65, pg. 165121 (2002) for 100% doping. The absorption curves for light polarized along $N_m$ and $N_p$ cross at approximately 947 nm as illustrated in (a). The inset (b) shows the same data over a larger range.

Figure 5:
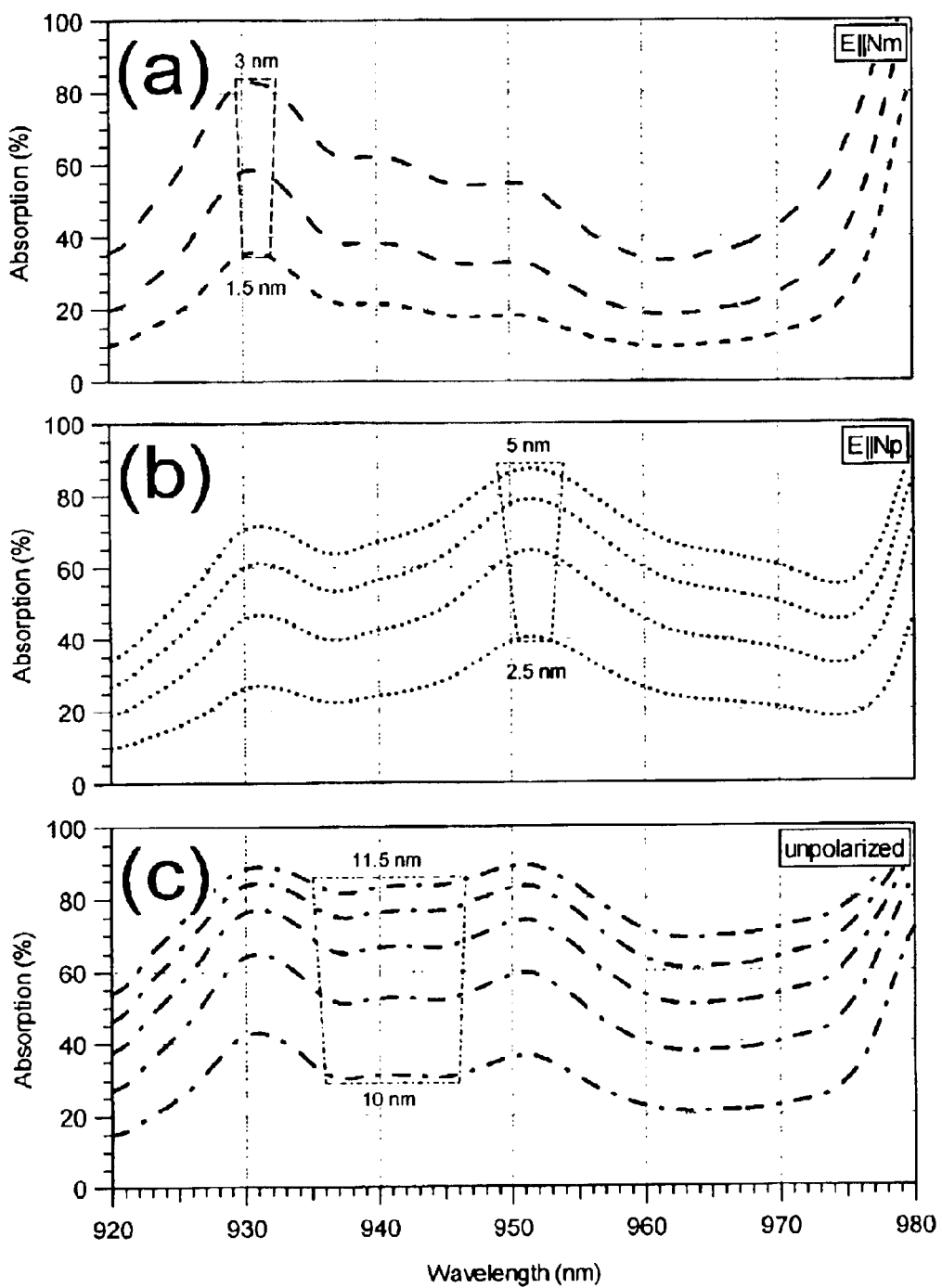
FIG. 5 shows the total absorption for different crystal lengths calculated with the data shown in FIG. 3.

FIG. 5 illustrates the wavelength range over which the standard deviation of the total absorption of a Yb(5%):KYW crystal remains within 1.2% of the average absorption over that range for different crystal lengths and polarization states. Generally the variation of the total absorption is less pronounced if the crystal is longer. For light polarized parallel to Nm, which corresponds to a traditional pumping scheme, the spectral width of the absorption peak at 931 nm is narrow (1.5 to 3 nm for the shown crystal lengths). For light polarized parallel to Np the spectral width of the absorption peak at 952 nm is wider (2.5 to 5 nm for the shown crystal lengths). For unpolarized light, with equal contributions to the polarizations parallel to Nm and Np, the spectral width over which the absorption remains constant is significantly increased (over a plateau of 10 to 11.5 nm width for the shown crystal lengths).

Figure 6:
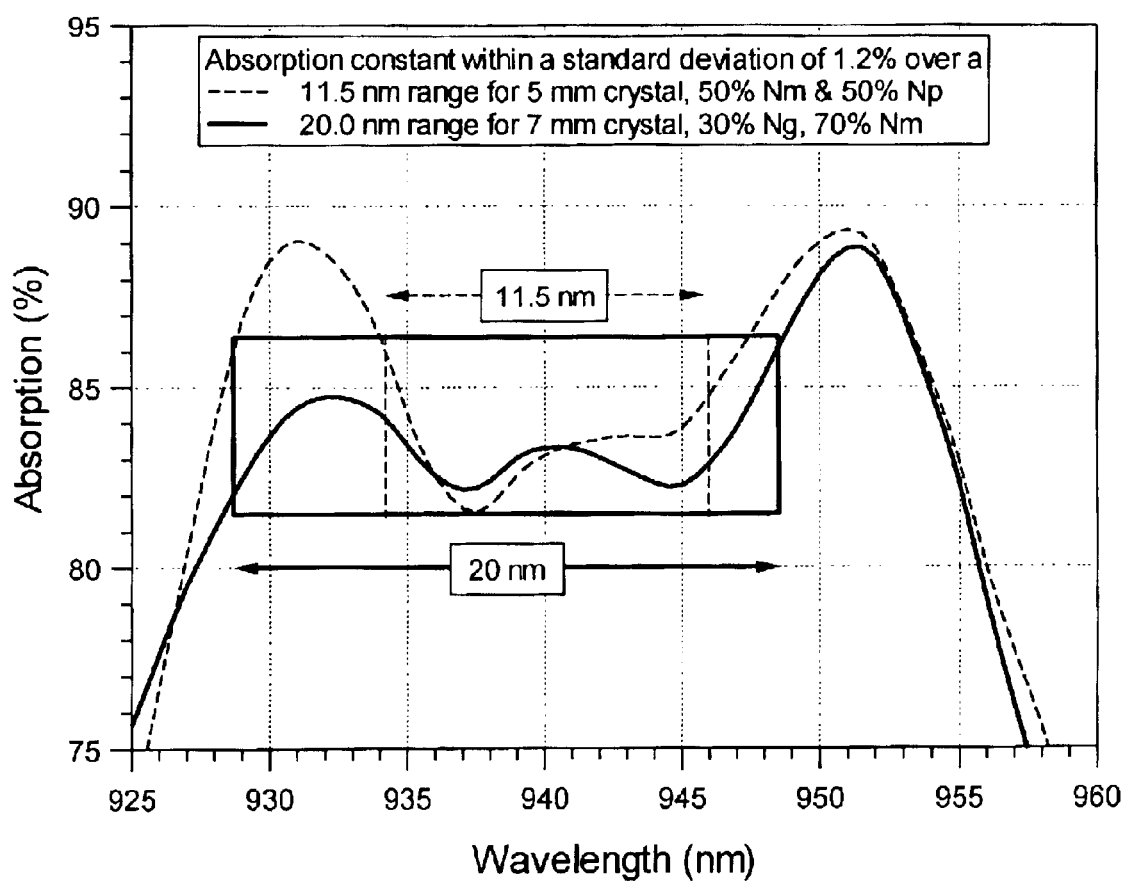
FIG. 6 illustrates the absorption coefficient when the polarization state is chosen to increase the range of wavelengths over which the absorption of the pump beam is constant.

FIG. 6 illustrates that a further increase of pump bandwidth can be achieved by using different pump power for the two polarizations Ng and Nm, whose absorption curves do not cross (see FIG. 4). The absorption value is given by:

$$A = 1 - p\exp(-\alpha_{Ng}l) - (1-p)\exp(-\alpha_{Nm}l).$$

The bandwidth over which the standard deviation of the total absorption of the Yb(5%):KYW crystal remains within 1.2% of the average absorption is increased by more than 70% with respect to the case of equal pump power along the Nm and Np axes, including but not limited to unpolarized light. Therefore, according to the invention, it can be beneficial to cut the crystal at an angle such that the absorption is not independent of the polarization of the pump light and to choose a polarization state of the pump light such that the wavelength range is increased over which the absorption remains similar.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical system that includes a gain media, comprising:

a diode pump source that produces a pump beam;

an optical coupler positioned between the diode pump source and the gain media, the pump beam passing through the optical coupler and wherein the gain media is cut at a selected angle, and the pump beam, with a selected polarization state, passes through the gain media in a selected direction to provide an increase in a range of wavelengths over which an absorption of the pump beam is constant.

2. The system of claim 1, wherein the pump beam is substantially unpolarized.

3. The system of claim 1, wherein the gain media is an ytterbium doped double-tungstate laser crystal.

4. The system of claim 3, wherein the wavelength of the pump beam is between 931 to 952 nm.

5. The system of claim 1, wherein the gain media is a thin disk.

6. The system of claim 1, wherein the pump source is fiber coupled.

7. The system of claim 1, wherein the coupler includes a polarization beam combiner.

8. The system of claim 1, wherein the coupler is an imaging coupler.

9. The system of claim 1, wherein the coupler is a non-imaging coupler.

10. The system of claim 1, wherein the coupler is a funnel.

11. The system of claim 1, wherein the pump beam passes through the gain medium multiple times.

12. The system of claim 11, wherein passage of the pump beam multiple times causes a rotation of a polarization state of the pump beam.

13. The system of claim 11, further comprising:
a relay optic to re-image the pump beam multiple times into the gain media.

14. The system of claim 1, further comprising:
a laser resonator, wherein the gain media is positioned in the laser resonator.

15. The laser system of claim 14, wherein a mode of the resonator is mode-matched to a size of a pumped volume in the gain media.

16. The laser system of claim 14, further comprising:
wherein the resonator is configured as a regenerative amplifier.

17. The system of claim 1, further comprising:
wherein the optical system is configured as a single or multi-pass amplifier.

18. The system of claim 1, wherein the gain media is made of a material selected from, Yb:KGW, Yb:KYW, Yb:S-FAP, Nd:KGW, Nd:KYW, or Nd:YVO$_4$, Cr:LiSAF, Cr:Forsterite, and a semiconductor media.

19. A method of broadening an absorption band in a gain media, comprising:
providing an optical system with the gain media made of a material with an anisotropic absorption, the gain media cut at an angle,
selecting a polarization state of a pump beam;
passing the pump beam through the gain media: and
selecting a direction of the pump beam through the gain media to increase a range of wavelengths over which an absorption of the pump beam is constant.

20. The method of claim 19, wherein a wavelength of the pump beam is at a center of a range of wavelengths over which an absorption of the pump beam is constant.

21. The method of claim 19, wherein the pump beam is substantially unpolarized.

22. The method of claim 19, wherein the gain media is an ytterbium doped double-tungstate laser crystal.

23. The method of claim 22, wherein the wavelength of the pump beam is between 931 to 952 nm.

* * * * *